No. 804,880. PATENTED NOV. 21, 1905.
J. L. PEPPARD.
AUTOMATIC WEIGHING APPARATUS.
APPLICATION FILED JUNE 28, 1905.

2 SHEETS—SHEET 1.

Witnesses
Frank R. Slow
H. C. Rodgers

Inventor
John L. Peppard
By George Y. Thorpe
atty

No. 804,880. PATENTED NOV. 21, 1905.
J. L. PEPPARD.
AUTOMATIC WEIGHING APPARATUS.
APPLICATION FILED JUNE 28, 1905.

2 SHEETS—SHEET 2.

Witnesses
Frank R. Glow.
H. C. Rodgers.

Inventor
John L. Peppard.
By George H. Thorpe
Atty.

UNITED STATES PATENT OFFICE.

JOHN L. PEPPARD, OF KANSAS CITY, MISSOURI.

AUTOMATIC WEIGHING APPARATUS.

No. 804,880.      Specification of Letters Patent.      Patented Nov. 21, 1905.

Application filed June 28, 1905. Serial No. 267,472.

*To all whom it may concern:*

Be it known that I, JOHN L. PEPPARD, a citizen of the United States, residing at Kansas City, in the county of Jackson and State of Missouri, have invented certain new and useful Improvements in Automatic Weighing Apparatus, of which the following is a specification.

This invention relates to automatic weighing apparatus, and more particularly to that class for weighing grain in sacks; and my object is to produce apparatus of this character which operates efficiently and reliably, can be instantly adjusted to effect accurate weighing, and can be easily, quickly, and cheaply assembled.

To this end the invention consists in certain novel and peculiar features of construction and organization, as hereinafter described and claimed; and in order that it may be fully understood, reference is to be had to the accompanying drawings, in which—

Figure 1:
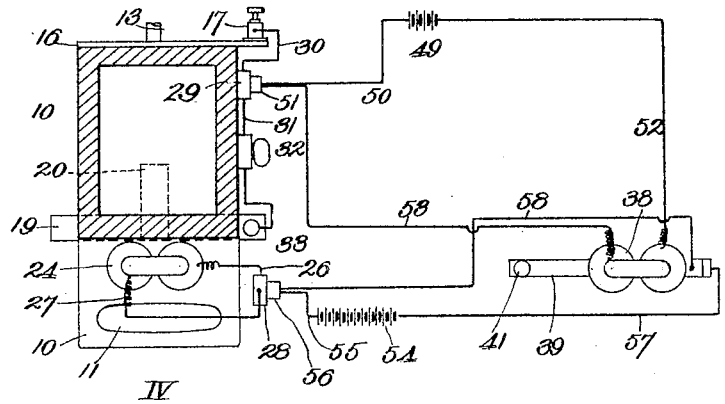
Figure 2:
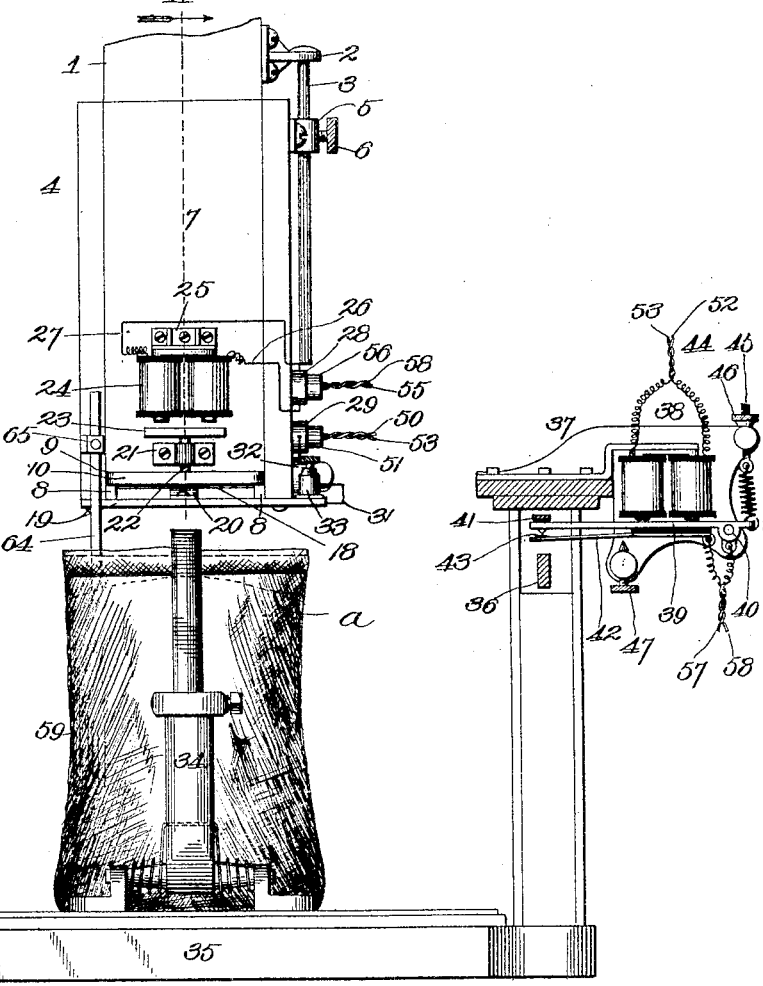
Figure 3:
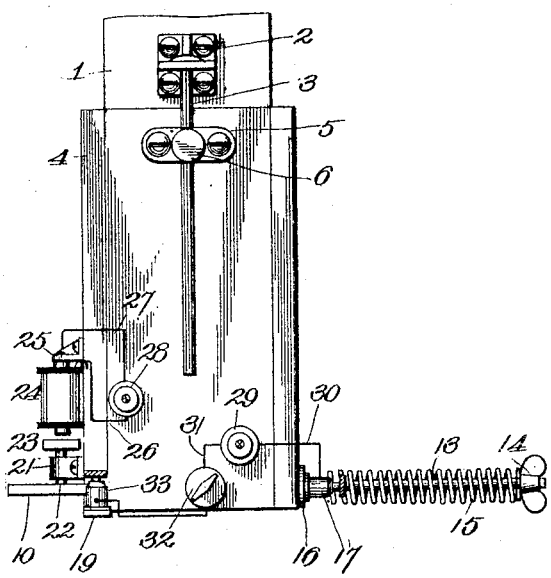
Figure 4:
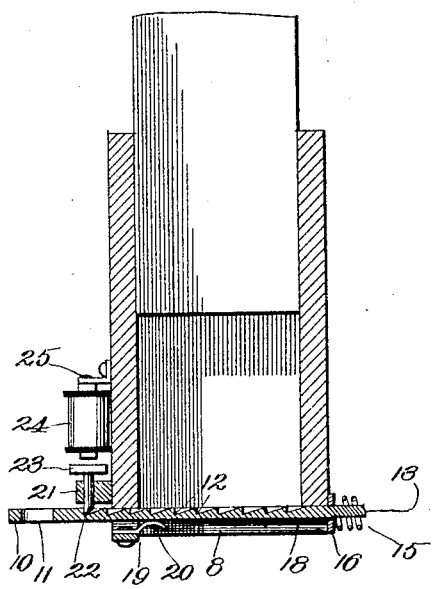
Figure 5:
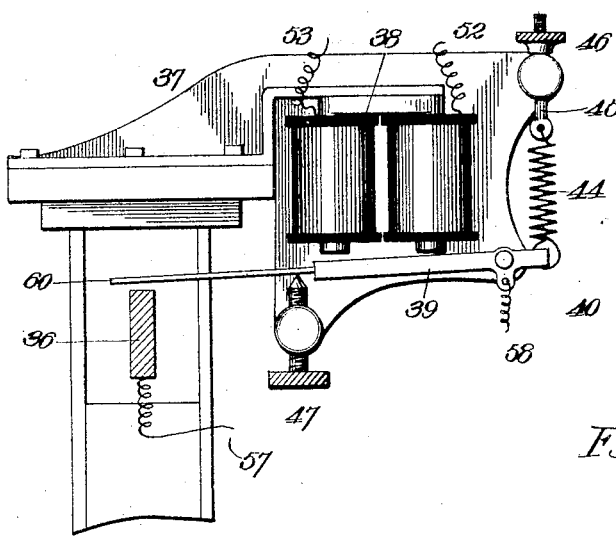
Figure 6:
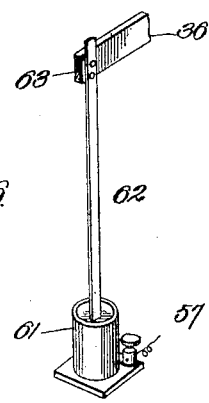

Figure 1 is a diagrammatic plan view of a weighing apparatus embodying my invention with the spout thereof shown in horizontal section. Fig. 2 is an end view of the apparatus with a part of it shown in section. Fig. 3 is a side view of a part of the apparatus. Fig. 4 is a vertical section on the dotted line IV of Fig. 2. Fig. 5 is an enlarged view of the character shown in Fig. 4, but disclosing a slightly-modified construction. Fig. 6 is a sectional perspective view of another modified form of construction.

In the said drawings, 1 indicates a grain-spout leading from an overhead bin, (not shown;) 2, a bracket projecting from said spout, and 3 a rod depending from said bracket. 4 is a telescopic extension for the spout; 5, a bracket projecting therefrom and slidingly engaging rod 3, and 6 a set-screw carried by bracket 5 to impinge on rod 3 and hold the extension at the desired point of adjustment.

Secured to the side walls of the extension and underlying the wall 7 thereof are cleats 8, so as to provide the interposed slot 9 for a slidable cut-off 10, preferably of metal, the cut-off being provided at one end with a slot 11 to form a handhold and in its upper side with a longitudinal series of notches 12 for a purpose which hereinafter appears. At its opposite end the plate is provided with a stem 13, engaged at its outer end by a wing-nut 14, an expansive coil-spring 15, mounted on stem 13, bearing at its opposite ends against wing-nut 14, and the metallic bearing-plate 16, secured to the extension and forming a guide for stem 13. The spring 15 normally holds the cut-off in the position shown most clearly in Fig. 4 to retain the grain in the spout.

At one end plate 16 is preferably equipped with a binding-post 17, and at its under side the slidable cut-off, which is always in electrical connection with plate 16, has an insulating-strip 18, adapted when the cut-off is open to engage the contact-spring 20, normally engaging the slidable cut-off and carried by the metallic cross-bar 19, secured to the lower end of the extension.

Arranged vertically over the center of the slidable cut-off and secured to the opposite end wall 7 from plate 16 is a guide-bearing 21 for the vertical reciprocatory catch 22, depending from the armature 23 of an electromagnet 24, secured by a bracket 25 to the extension. The conductors 26 and 27 from said magnet are electrically connected to the wall-socket 28, secured to the extension at any suitable point, said wall-socket being of any suitable or preferred type, and therefore not illustrated in detail or particularly described. A similar socket 29, also secured to the extension at any suitable point, is connected by conductor 30 with binding-post 17 and by conductor 31 with binding-post 33, secured to bar 19, a suitable switch 32 of common and well-known construction and secured to the extension being mounted on conductor 31, so as to make or break an electric circuit through said conductor. All of the parts thus far described are by preference permanently carried by the extension.

34 indicates a sack-holder of common and well-known construction, and therefore not detailed or particulary described, mounted on the platform 35 of a suitable weighing-scale, the beam 36 of the scale being shown in section.

37 is a bracket secured to the top of the scale and projecting laterally therefrom, and 38 is an electromagnet carried by and insulated from said bracket, the armature 39 of said magnet being pivoted, as at 40, on said bracket and being provided by preference with an adjustable contact in the form of a screw 41. 42 is a resilient needle carried by and insulated from the armature and interposed between the same and the scale-beam and provided at its upper side with a platinum or equivalent contact-point 43 for engagement at times with contact 41.

Normally holding the armature depressed, and therefore away from the magnet, is a retractile spring 44, attached at its lower end to the armature and at its upper end to a screw 45, extending through a projection of bracket 37 and engaged at its upper end by a thumb-nut 46, whereby said spring may be tensioned, an adjustable stop 47, also mounted in bracket 37 and underlying the needle, limiting the downward movement of the latter, so that it shall be held normally out of contact with the scale-beam.

49 is a local battery adapted to be boxed (not shown) on a fixed part of the scale, and 50 is a conductor leading from the positive pole of said battery to an ordinary plug 51 for detachable engagement with socket 29.

52 is a conductor leading from the opposite pole of the battery to magnet 38, and 53 a conductor leading from said magnet to said socket-plug and of course insulated from conductor 50, so that when the slidable cut-off is closed, as shown in Fig. 4 most clearly, the circuit is as follows: from the battery through conductor 50 to socket 29, then through conductor 30, binding-post 17, plate 16, cut-off 10, spring-contact 20, bar 19, binding-post 33, and conductor 31, and switch 32 thereof back to said socket 29, thence through conductor 53 to the magnet 38, and from said magnet through conductor 52 to the battery.

When the switch is closed, the magnet 38 is energized so that it shall attract armature 39 and hold the same and the resilient needle 42 elevated, so that the latter is entirely above the range of movement of the scale-beam, as shown in Fig. 2. When the switch is open, the magnet is deënergized and the spring 44 depresses the armature until the needle is arrested by adjustable stop 47 and is within the range of upward movement of the scale-beam, as shown in Fig. 5.

54 is the main battery, which is also adapted to be boxed onto the scale-beam in any suitable manner, (not shown,) and 55 is a conductor connecting the positive pole of said battery with a plug 56 of the same character as plug 51 and detachably engaging the socket 28. A conductor 57 leads from the negative pole of the battery to the needle in Fig. 2 or to the scale-beam, as in Fig. 5, it being understood that with the construction shown in Fig. 5 the conductor 57 will preferably be connected to said beam 36 at the fulcrum-point thereof and not directly, as shown, the showing in said Fig. 5 being for convenience of illustration. Conductor 58 leads from the armature to the plug 56, and in this connection it should be stated that the conductors for each circuit in practice are twisted together for compactness and greater convenience in handling.

In view of the fact that the needle and armature of Fig. 2 and the scale-beam and needle 60 of Fig. 5, in which figure the needle is simply an extension of the armature, are normally out of contact it will be apparent that when the magnet 38 is deënergized and the scale-beam rises and contacts with needle 60 or engages needle 42 and causes it to engage contact-point 41 a circuit is established, which is as follows: from battery 54, through conductor 55, to socket 28, from said socket, through magnet 24 and conductor 26, back to the socket, thence through conductor 58, through the armature and needle, to the scale-beam, and from the latter, through conductor 57, back to the battery 54.

When the weighing operation is to begin, the sack 59 is secured upon the sack-holder in the usual manner vertically below the spout. The operator then sets the poise (not shown) at the required point on the beam—say to weigh one hundred pounds—and grasping the handle of the cut-off through slot 11 draws said cut-off toward him against the resistance of spring 15 the required distance, the gravity-catch 22 slipping from notch to notch 12 and holding the cut-off at the desired point of adjustment. As the cut-off is thus opened, assuming that the switch 32 is closed, the insulating-strip 18 comes into engagement with contact-spring 20 and breaks the circuit through battery 49, and as a result magnet 38 is deënergized and the armature and needle drop until arrested by the adjustable stop 47, as hereinbefore explained. At the instant the cut-off is opened the grain of course begins to fall into the sack and continues to fall until its weight causes the beam to rise and in the construction shown in Fig. 2 push the needle 42 until its contact-point 43 engages adjustable contact 41, so as to complete the circuit from the battery 54, this result being instantly followed by the energization of magnet 24 and the attraction of its armature 23, which raises the catch from engagement with the slide and permits spring 15 to instantly close the cut-off.

In practice in view of the fact that there is a quantity of the grain in the air when the beam begins to rise—viz., that quantity from the cut-off to the level of grain in the sack (indicated by dotted line $a$)—the adjustable stop 47 is set to permit the needle to descend below the balancing-point, so that the beam will contact with it before said beam is balanced. The instant the contact is made and the cut-off is closed the insulating-strip 18 is withdrawn from engagement with spring 20, and the latter snaps into engagement with the cut-off and reëstablishes the circuit through battery 49, and therefore reëlevates the needle to its original position above the range of movement of the beam, so that the operator by observing the latter can tell whether it is exactly balanced or not. For the purpose of predetermining the weight of the grain which enters the sack as and after the cut-off is closed the following mechanism is provided: 64 indicates an indicator carried by the spout extension, to be slid downwardly by the operator after one sack is filled until the lower end of said indicator touches the grain in the sack, said indicator being then secured by the setscrew 65 rigidly with relation to the extension, so that in case the extension is afterward adjusted vertically upon the spout or removed therefrom and placed upon another it can be quickly and easily secured at the proper height by first balancing a hundred-pound sack of grain upon the scales and then adjusting the extension until the indicator 64 touches the grain in the sack, set-screw 65 being then manipulated to clamp the extension at such point.

When the apparatus is not in use, the switch 32 is turned to break the circuit through battery 49, so as to conserve its energy, and thereby operate the apparatus on an economical basis.

By disengaging plugs 51 and 56 from their respective sockets the scale and the parts carried thereby can be shifted to a second spout and electrically connected therewith by causing the engagement of said plugs with the sockets of said second spout, so that it will be unnecessary to provide more than one scale with the attachments carried thereby unless the volume of business justifies it. For further economy the entire extension 4 may also be removed from spout 1 and placed upon another spout, provided each is equipped with independent cut-offs, (not shown,) so that the grain cannot escape when the extension is removed. As the use of such cut-off for the spout involves no invention, it has not been illustrated.

The needle construction shown in Fig. 2 is the preferred construction, because the electric current does not pass through the scale-beam, whereas in the construction shown in Fig. 5 where the current passes through the beam the latter becomes blackened and disfigured, because of the arcing incident to the breaking of the circuit between it and the needle.

In Fig. 6 the conductor 57 may be connected electrically to the mercury-cup 61 and the former be adapted to come in contact with the needle 42 or 60, as the case may be, said bar 62 being movable with but insulated from the beam, as at 63.

It is obvious that other modifications will readily suggest themselves, and for this reason it is to be understood that I do not restrict myself to the precise construction, form, and arrangement illustrated.

Having thus described the invention, what I claim as new, and desire to secure by Letters Patent, is—

1. In an automatic weighing apparatus, the combination of a spout, a weighing-scale, an electric circuit, comprising a source of electric supply, an electromagnet having a yieldingly-retracted armature, a slidable cut-off for the spout, and a contact yieldingly engaging the cut-off when closed, with a needle movable with the armature and out of the range of movement of the scale-beam when the cut-off is closed, and means actuated by the cut-off when open to break the circuit between it and the contact.

2. In an automatic weighing apparatus, the combination of a spout, a weighing-scale, an electric circuit, comprising a source of electric supply, an electromagnet having a yieldingly-retracted armature, means to limit the retractive movement of the armature, a slidable cut-off for the spout, and a contact yieldingly engaging the cut-off when closed, with a needle movable with the armature and out of range of movement of the scale-beam when the cut-off is closed, and means actuated by the cut-off when open to break the circuit between it and the contact.

3. In an automatic weighing apparatus, the combination of a spout, a weighing-scale, an electric circuit, comprising a source of electric supply, an electromagnet having a yieldingly-retracted armature, a slidable cut-off for the spout, a switch, and a contact yieldingly engaging the cut-off when closed, with a needle movable with the armature and out of the range of movement of the scale-beam when the cut-off is closed, and means actuated by the cut-off when open to break the circuit between it and the contact.

4. In an automatic weighing apparatus, the combination of a spout, a cut-off therefor, armature-retractable means for holding the cut-off open, a source of electric supply, an electromagnet connected thereto, a needle electrically connected to the source of electric supply and the magnet, a weighing-scale, means whereby the rising of the scale-beam until it contacts with the needle, results in the completion of a circuit through and the consequent energization of the magnet and causes it to trip the armature-retractable means from engagement with the cut-off, and means to close the cut-off when released.

5. In an automatic weighing apparatus, the combination of a spout, a slidable cut-off therefor, a source of electric supply, a magnet in circuit with such source of electric supply and cut-off when the latter is closed and out of circuit therewith when the cut-off is open, an armature for said magnet provided with a contact-point, a spring for retracting said armature when the circuit is broken, a resilient needle carried by and insulated from said armature and overlying the scale-beam, a catch holding the cut-off open, an armature connected to said catch, an electromagnet for said armature, a source of electric supply, electric conductors connecting the last-named source of electric supply with the last-named magnet and the needle, and electric conductors connecting said first-named armature with the last-named electromagnet.

6. In an automatic weighing apparatus, the combination of a spout, a slidable cut-off therefor, a source of electric supply, a magnet in circuit with such source of electric supply and cut-off when the latter is closed and out of circuit therewith when the cut-off is open, an armature for said magnet provided with a contact-point, a spring for retracting said armature when the circuit is broken, a resilient needle carried by and insulated from said armature and overlying the scale-beam, a catch holding the cut-off open, an armature connected to said catch, an electromagnet for said armature, a source of electric supply, electric conductors connecting the last-named source of electric supply with the last-named magnet and the needle, electric conductors connecting said first-named armature with the last-named magnet, and means whereby the cut-off is automatically closed when the rising of the scale-beam causes the needle and the armature carrying it to come into contact and establish the circuit which energizes the last-named magnet.

In testimony whereof I affix my signature in the presence of two witnesses.

JOHN L. PEPPARD.

Witnesses:
A. C. RODGERS,
G. Y. THORPE.